US009810888B2

(12) United States Patent
Spencer et al.

(10) Patent No.: US 9,810,888 B2
(45) Date of Patent: Nov. 7, 2017

(54) DUAL-PUPIL DUAL-BAND WFOV RE-IMAGING OPTICAL SYSTEMS

(71) Applicant: RAYTHEON COMPANY, Waltham, MA (US)

(72) Inventors: Susan B. Spencer, Rolling Hills Estates, CA (US); John F. McGee, III, Plano, TX (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/838,745

(22) Filed: Aug. 28, 2015

(65) Prior Publication Data

US 2017/0059830 A1    Mar. 2, 2017

(51) Int. Cl.

| G02B 26/08 | (2006.01) |
| G02B 13/14 | (2006.01) |
| G02B 27/10 | (2006.01) |
| G02B 7/02 | (2006.01) |
| G02B 26/00 | (2006.01) |
| G02B 15/06 | (2006.01) |

(52) U.S. Cl.
CPC ........... *G02B 13/146* (2013.01); *G02B 7/028* (2013.01); *G02B 15/06* (2013.01); *G02B 26/001* (2013.01); *G02B 26/08* (2013.01); *G02B 27/1013* (2013.01); *G02B 27/1066* (2013.01)

(58) Field of Classification Search
CPC ...... G02B 26/001; G02B 26/08; G02B 7/028; G02B 13/146; G02B 27/1013; G02B 27/1066
USPC ................ 359/629, 721, 722, 726, 733, 735
See application file for complete search history.

(56) References Cited

U.S. PATENT DOCUMENTS

| 4,384,198 A | 5/1983 | Williamson |
| 4,795,256 A | 1/1989 | Krause et al. |
| 4,907,895 A | 3/1990 | Everest |
| 5,049,740 A | 9/1991 | Pines et al. |
| 5,485,306 A | 1/1996 | Kiunke et al. |
| 6,676,266 B2 | 1/2004 | Dromaretsky |
| 8,101,918 B1 | 1/2012 | Mercado |
| 8,836,794 B2 | 9/2014 | Vizgaitis |

(Continued)

OTHER PUBLICATIONS

International Search Report and Written Opinion of the International Searching Authority for application No. PCT/US2016/036296 dated Sep. 30, 2016.

*Primary Examiner* — James Phan
(74) *Attorney, Agent, or Firm* — Lando & Anastasi, LLP

(57) ABSTRACT

Dual-pupil, dual spectral band wide field-of-view re-imaged refractive optical imaging systems. In one example an optical imaging system includes a dual-band front objective lens group configured to receive electromagnetic radiation over the field-of-view of the optical imaging system, to form a first pupil, and to direct the electromagnetic radiation through the first pupil, the electromagnetic radiation including first and second non-overlapping spectral bands, and the field-of-view spanning at least 45°×45°, and a re-imaging refractive optical sub-system configured to receive the electromagnetic radiation via the first pupil, to form at least one intermediate image plane, and to focus the electromagnetic radiation via at least one second pupil onto at least one final image plane to form a first image from the first spectral band and a second image from the second spectral band. A beam deflector can be positioned proximate the first pupil to expand the field of view.

19 Claims, 9 Drawing Sheets

(56) References Cited

U.S. PATENT DOCUMENTS

2005/0243411 A1 11/2005 Cook
2011/0052166 A1 3/2011 Cornell et al.
2014/0139926 A1 5/2014 Cook

DUAL-PUPIL DUAL-BAND WFOV RE-IMAGING OPTICAL SYSTEMS

BACKGROUND

There are numerous conventional optical imaging systems that have dual field-of-view (FOV) capability, typically, the ability to switch between a narrow FOV and a wider FOV. Such systems conventionally use a device that is "flipped" or rotated into and out of the optical path to change between the narrow FOV and the wider FOV. Certain of these systems are also dual-band (i.e., image in two spectral bands). However, these systems have lesser FOV in one of the spectral bands or paths. Furthermore, conventional systems designed to perform fast imaging over very wide fields of regard tend to include multiple optical subsystems, each imaging over a portion of the field of regard, and are therefore comprised of multiple imaging sensors (e.g. focal plane arrays), along with multiple cooling systems (for infrared operation) and respective electronics. As a result, such systems tend to be bulky, costly, and prone to failure due to the need for multiple relatively unreliable components.

SUMMARY OF INVENTION

Aspects and embodiments are directed to optical systems that address the cost and reliability problems associated with electo-optical (EO) or infrared (IR) sensor systems designed to perform fast wide field-of-view detection, tracking, and identification functions, for example, to protect against adversarial airborne and surface threats. In particular, aspects and embodiments provide optical systems that include two pupils and an intermediate image plane in addition to one or more final image planes. These optical designs extend to any systems in which having a second pupil in addition to the pupil used for infrared cold shielding is beneficial, and to any systems in which having an image plane in addition to the image plane(s) used for the imaging sensor (e.g., focal plane array) is beneficial. The additional pupil and image plane capability is provided in a dual-band wide field-of-view (WFOV) optical design format, as discussed further below.

According to one embodiment, a dual-pupil, dual spectral band, wide field-of-view re-imaged refractive optical imaging system comprises a dual-band front objective lens group configured to receive electromagnetic radiation over the field-of-view of the optical imaging system, to form a first pupil of the optical imaging system, and to direct the electromagnetic radiation through the first pupil, the electromagnetic radiation including first and second non-overlapping spectral bands, the field-of-view spanning at least 45°×45°, and a re-imaging refractive optical sub-system configured to receive the electromagnetic radiation via the first pupil, to form at least one intermediate image plane, and to focus the electromagnetic radiation via at least one second pupil onto at least one final image plane to form a first image from the first spectral band and a second image from the second spectral band.

Various embodiments of the optical imaging system may include any one or more of the following features.

In one example the at least one intermediate image plane is a single intermediate image plane, the at least one second pupil is a single second pupil. In this example, the re-imaging refractive optical sub-system may include a first dual-band lens group configured to receive the electromagnetic radiation via the first pupil and to form the intermediate image plane, the first dual-band lens group including a first lens and a second lens, the first pupil being located between the dual-band front objective lens group and the first lens, and the intermediate image plane being positioned between the first and second lenses. The re-imaging refractive optical sub-system may further include a second dual-band lens group configured to receive the electromagnetic radiation from the second lens of the first dual-band lens group and to focus the electromagnetic radiation onto the at least one image plane via the second pupil, the second pupil being located between the second dual-band lens group and the at least one image plane.

In one example the first spectral band includes a mid-wave infrared (MWIR) spectral band and the second spectral band includes a short-wave infrared (SWIR) spectral band. The optical imaging system may further comprise a cooling chamber, such as a dewar or cryo-vac cooler, having a chamber window positioned between the second dual-band lens group and the second pupil, the at least one image plane being located within the cooling chamber. In one example a cold stop is positioned proximate the second pupil.

The optical imaging system may further comprise a filter having an adjustable thickness and positioned between the second dual-band lens group and the second pupil. In one example the at least one image plane includes a first image plane positioned a first distance from the second pupil and a second image plane positioned a second distance from the second pupil, the first and second distances being different. The optical imaging system may further comprise a controller configured to selectively adjust the adjustable thickness of the filter to a first thickness to focus the MWIR spectral band onto the first image plane and to a second thickness to focus the SWIR spectral band onto the second image plane.

In one example the MWIR spectral band includes a first wavelength range of approximately 3.4 µm-5.0 µm, and the SWIR spectral band includes a second wavelength range of approximately 1.0 µm-2.0 µm. In such an example, the first lens of the first dual-band lens group can be made of Zinc Sulfide and the second lens of the first dual-band lens group can be made of Zinc Selenide. In another such example, the dual-band front objective lens group includes a set of three lenses, including a first objective lens that can be made of Zinc Selenide, a second objective lens that can be made of chalcogenide glass, and a third objective lens that can be made of Zinc Selenide. The second dual-band lens group can include a set of four lenses, including a third lens that can be made of chalcogenide glass, a fourth lens that can made of Barium Fluoride, a fifth lens that can made of SPINEL, and a sixth lens that can be made of Barium Fluoride. In one example, each of the first lens and the second lens of the first dual-band lens group has a spherical surface and an opposing aspheric surface. The two lenses can be arranged such that the aspheric surfaces face one another. In another example the first objective lens can be spherical lens, and each of the second and third objective lenses can have a spherical surface and an opposing aspheric surface. The objective lenses can be arranged with the second objective lens positioned between the first and third objective lenses and, and the third objective lens positioned between the second objective lens and the first pupil. In another example, each of the four lenses in the second dual-band lens group has a spherical surface and an opposing aspheric surface.

In one example an optical speed of the optical imaging system is F/2.0.

According to another example, the optical imaging system further comprises a beamsplitter positioned between the first pupil and the re-imaging refractive optical sub-system and configured to split the electromagnetic radiation into the first spectral band and the second spectral band, wherein the first spectral band includes a mid-wave infrared (MWIR) spectral band and the second spectral band includes a short-wave infrared (SWIR) spectral band. In this example, the re-imaging refractive optical sub-system can include an MWIR sub-system configured to receive MWIR spectral band via the first pupil, to form an MWIR intermediate image plane, and to focus the MWIR spectral band via an MWIR second pupil onto an MWIR final image plane to form the first image, and an SWIR sub-system configured to receive the SWIR spectral band via the first pupil, to form an SWIR intermediate image plane, and to focus the SWIR spectral band via an SWIR second pupil onto an SWIR final image plane to form the second image.

In one such example the MWIR sub-system includes a first pair of lenses and a second pair of lenses, the MWIR intermediate image plane being positioned between first and second lenses of the first pair of lenses, and the second pair of lenses being positioned between the first pair of lenses and the MWIR second pupil. In one example the first and second lenses of the first pair of lenses are made of silicon, a first lens of the second pair of lenses is made of Germanium and a second lens of the second pair of lenses is made of silicon. The first and second lenses of the second pair can be arranged such that the first lens of the second pair is positioned between the second lens of the first pair and the second lens of the second pair. In one example the MWIR sub-system further includes a cooling chamber, such as a dewar or cryo-cooler, having a chamber window positioned proximate the MWIR second pupil, the chamber window being transparent to the MWIR spectral band, and the MWIR final image plane being located within cooling chamber.

In another example the SWIR sub-system includes a first lens group and a second lens group, the first lens group including a first lens and a second lens, the SWIR intermediate image plane being positioned between the first lens and the second lens, and the second lens group being positioned between the second lens of the first lens group and the SWIR second pupil. In one example the first lens is made of Zinc Sulfide and the second lens is made of Zinc Selenide, and the second lens group includes a third lens made of chalcogenide glass, a fourth lens made of Barium Fluoride, and a fifth composite lens, the fifth composite lens including a first lens element made of glass and a second lens element made of Barium Fluoride.

The optical imaging system may further comprise a second dual-band front objective lens group having a second field-of-view spanning at least 45°×45°, and a beam deflector disposed proximate the first pupil and configured to selectively deflect a line-of-sight of the optical imaging system to the second dual-band front objective lens set. The optical imaging system can further include a controller coupled to the beam deflector and configured to actuate the beam deflector to alternately switch the line-of-sight between the dual-band front objective lens set and the second dual-band front objective lens set. In one example the beam deflector is a chopper mirror.

In other examples, a device or element other than a beam deflector can be positioned proximate the first pupil. For example, an aperture reformatter, filter, deformable mirror, wavefront sensor, calibration device, or de-jitter mirror can be placed proximate the first pupil. In addition, a device or element, such as a Hadamard mask, a laser jamming reduction device, a field stop, or a shutter can be placed proximate the intermediate image plane(s).

According to another embodiment, a dual-pupil, dual spectral band, wide field-of-view re-imaged infrared refractive optical imaging system comprises a dual-band front objective lens group configured to receive infrared electromagnetic radiation over the field-of-view of the optical imaging system, to form a first pupil of the optical imaging system, and to direct the electromagnetic radiation through the first pupil, the electromagnetic radiation including an MWIR spectral band and an SWIR spectral band, the field-of-view spanning at least 45°×45°. The imaging system further comprises a beamsplitter configured to receive the electromagnetic radiation from the dual-band front objective lens set and to split the electromagnetic radiation into the MWIR and SWIR spectral bands. The imaging system further comprises an MWIR re-imaging refractive optical sub-system configured to receive the electromagnetic radiation in the MWIR spectral band from the beamsplitter, to form an MWIR intermediate image plane, and to focus the electromagnetic radiation in the MWIR spectral band via an MWIR second pupil onto an MWIR final image plane to form an MWIR image, and an SWIR re-imaging refractive optical sub-system configured to receive the electromagnetic radiation in the SWIR spectral band from the beamsplitter, to form an SWIR intermediate image plane, and to focus the electromagnetic radiation in the SWIR spectral band via an SWIR second pupil onto an SWIR final image plane to form an SWIR image.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
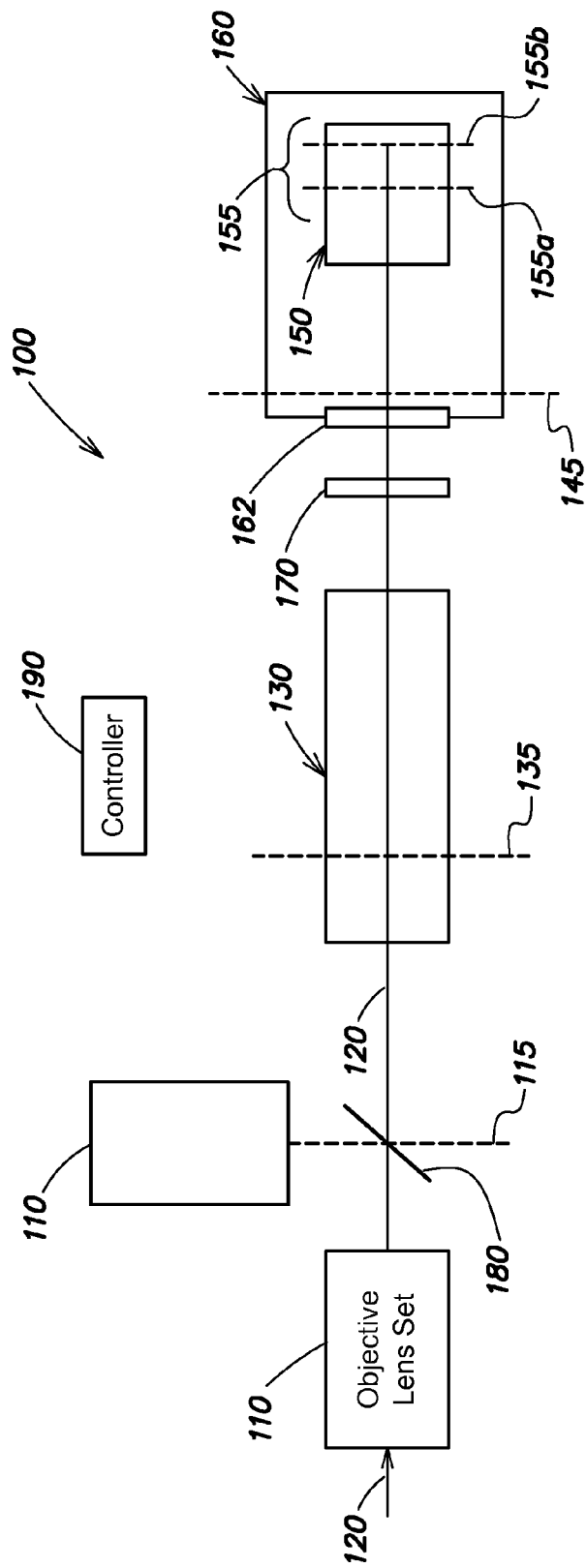
FIG. 1 is a block diagram of one example of a dual-FOV, dual-band re-imaging optical system according to aspects of the present invention.

Aspects and embodiments are directed to dual-band re-imaging optical systems that provide both a re-imaged pupil (dual pupil design) and re-imaged field (i.e., having an intermediate image plane in addition to the final image plane) in each of two spectral bands and over a wide field-of-view (FOV). In contrast, although there are many conventional dual-band or dual-FOV optical systems, these systems do not re-image the pupil or field for very wide FOV dual-band designs. As discussed above, conventional dual-band systems tend to have a narrow FOV in at least one spectral band. In addition, as discussed further below, certain embodiments of the optical systems disclosed herein have fast f-numbers in both spectral bands and over both wide fields-of-view, whereas, in contrast, conventional dual-band or dual-FOV systems tend to have a slow f-number in at least one band or FOV.

According to certain embodiments, there is provided a wide FOV optical system having a re-imaged pupil and re-imaged field optical design form that is configured for two infrared spectral bands, for example, mid-wave infrared (MWIR) and short-wave infrared (SWIR), and which supports a small high-reliability chopper mirror to achieve twice the FOV and thereby elimination of an imaging sensor, cryo-cooler, and supporting electronics that would normally be necessary for a comparable field of view. Thus, certain aspects reduce the number of imaging sensors, cooling systems, and their supporting electronics by integrating a wide FOV re-imaged optical design with a highly reliable chopper mirror, or other beam director, to produce two channel (spectral bands) multiplexed measurements. In certain examples, the integrated system doubles the effective field of view, while providing high bandwidth dual-band imaging capabilities.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1, there is illustrated a block diagram of one example of a re-imaging optical system according to certain embodiments. The system 100 includes front objective optics 110, for example, a front objective lens set, which receives incident electromagnetic radiation 120 and forms a first pupil 115. The electromagnetic radiation 120 travels via the first pupil 115 to re-imaging and focusing optics 130, which are configured to produce an intermediate image plane 135 and a second pupil 145, and to focus the electromagnetic radiation 120 to a detector assembly 150 and onto a final image plane 155. As discussed further below, the optics 130 includes a plurality of lenses, the number, materials, and arrangement of which may vary depending on the spectral bands over which the system 100 is designed to operate. The detector assembly 150 may include one or more imaging sensors, for example, one or more focal plane arrays (FPAs). Additional optical element(s) 170 may be included in the optical path between the optics 130 and the second pupil 145. These optical element(s) 170 may include, for example, spectral or polarization filters, corrector plates, or other elements.

According to certain embodiments, the system 100 is configured for infrared imaging. Accordingly, as shown in FIG. 1, the system 100 can include a housing 160 designed to provide cold shielding for the detector 150, such as a dewar or cryogenic cooling apparatus (typically referred to as a cryo-cooler 160). The cryo-cooler 160 can be configured to cool the detector assembly 150 to well below ambient temperatures, for example, to approximately 80° Kelvin, to reduce thermal noise and enable thermal imaging in the MWIR or long-wave infrared (LWIR) spectral bands. The cryo-cooler 160 includes a window 162 that can be positioned proximate (i.e., at or near) the second pupil 145. The window 162 may be coincident with, or may serve as, a cold aperture stop for the system 100.

In certain dual-band examples, absent adjustment, electromagnetic radiation in the two different spectral bands (e.g., MWIR and SWIR) may focus onto different, or offset, final image planes. Thus, for example, one spectral band may be focused onto a first final image plane 155a and the other spectral band may be focused onto a second final image plane 155b. In this case, the detector assembly 150 can include two different imaging sensors (e.g., two different FPAs), one for each spectral band, respectively positioned at the two final image planes 155a and 155b. Alternatively, the detector assembly 150 can include a dual-band imaging sensor that is arranged to have band-sensitive imaging elements arranged at each of the two final image planes 155a and 155b. In other examples, the system 100 can include one or more elements that adjust the focus of one or both spectral bands such that both bands are focused onto a single final image plane. For example, the element 170 can include a filter having an adjustable thickness that can be selectively adjusted to a first thickness at which the first spectral band is focused onto a final image plane, and a second thickness at which the second spectral band is focused onto the same final image plane. In this configuration, the two spectral bands are individually sequentially imaged, and the filter thickness can be rapidly varied to alternate between imaging of the two spectral bands. A controller 190 can be configured to provide a control signal to adjust the filter thickness, either automatically according to a programmed imaging operation or responsive to input from a user or external electronic system.

As discussed above, embodiments of the system 100 support inclusion of an optical deflector or beam director, such as a chopper mirror 180 for example, positioned proximate (i.e., at or near) the first pupil 115 and configured to expand the effective FOV of the system. In one example, the chopper mirror 180 can be rapidly moved to switch the detector line-of-sight between a first FOV and a second FOV. The controller 190 can be configured to provide a control signal to actuate the chopper mirror to switch the fields-of-view, either automatically according to a programmed imaging operation or responsive to input from a user or external electronic system. In the illustrated example, the system 100 includes two identical objective lens sets 110, each positioned to provide the same angular FOV over different spatial areas. The two fields-of-view can be overlapping, adjacent, or spaced apart from one another. This arrangement requires duplication of the objective lens set 110; however, the same re-imaging and focusing optics 130, detector assembly 150, and cryo-cooler 160 can be used for imaging over both fields-of-view. Thus, very wide-FOV imaging can be achieved while duplication of potentially expensive, bulky, and fragile components, such as the imaging sensor(s) or cryo-cooler 160, is avoided. For example, the FOV of the system 100 can be approximately 47° by 47° for each objective lens set 110, and therefore, using the chopper mirror 180 can expand the effective FOV to approximately 94° by 94°. Furthermore, the application of a pupil re-imaged system enables the use of a practically sized chopper mirror 180 (because it can be placed proximate the first pupil 115), whereas in a non-re-imaged system, the chopper mirror would become too large due to the need to place the mirror in diverging ray space. In other examples, other optical elements can be placed proximate the first pupil 115 to enable other functionality, as discussed further below.

Figure 2:
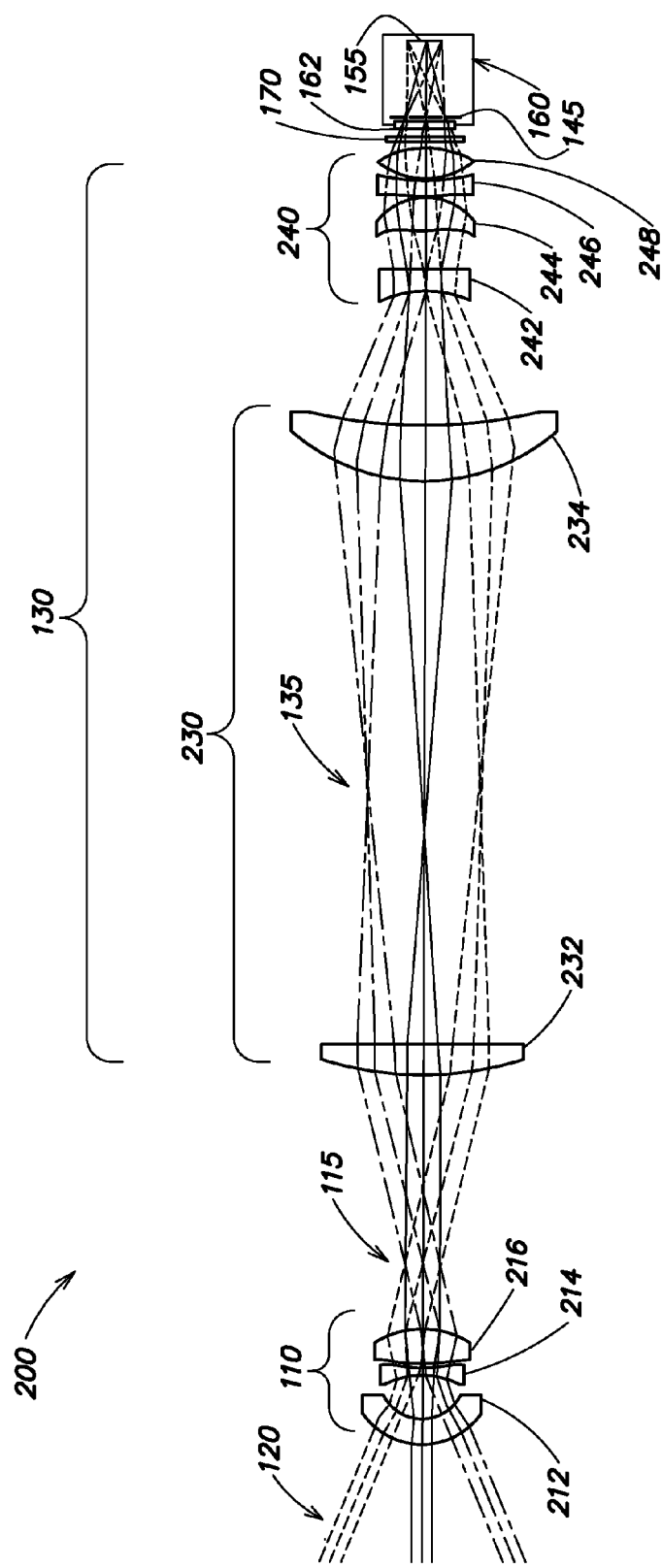
FIG. 2 is a ray trace of one example of a dual-band infrared re-imaging optical system corresponding to an example of the system of FIG. 1, according to aspects of the present invention.

Referring to FIG. 2 there is illustrated a ray trace of one example of an implementation of the optical system 100 according to certain embodiments. In one embodiment, the optical system 200 is configured for dual-band operation in the MWIR and SWIR spectral bands. In particular, in one example, the MWIR spectral band includes wavelengths in the range of approximately 3.4 µm to 5.0 µm, and the SWIR spectral band includes wavelengths in the range of approximately 1.0 µm to 2.0 µm. In this embodiment, the optical elements are all dual-band optics configured for the MWIR and SWIR bands. The electromagnetic radiation 120 therefore includes both the MWIR and SWIR wavelength ranges in this example. In the illustrated example, the system 200 is configured to have a very wide instantaneous FOV (e.g., at least 45° by 45°, and in one example, 47° by 47°), i.e., without requiring the use of any beam-steering mechanisms. In addition, although not illustrated in FIG. 2, the system 200 can accommodate a chopper mirror 180 (not shown in FIG. 2) positioned proximate the first pupil 115, as discussed above with reference to FIG. 1, to provide dual-FOV coverage, for example, of at least 90° by 90°, and in one example, 94° by 94°, by switching the optical path between the two objective lens sets 110. An imaging sensor, for example, a focal plane array (FPA) can be positioned at the final image plane 155.

Table 1 below provides an example of system parameters corresponding to an embodiment of the system 200 shown in FIG. 2.

TABLE 1

| Parameter | MWIR FOV | SWIR FOV |
|---|---|---|
| Wavelength for Q (µm) | 4.2 | 1.5 |
| Front Aperture Size | 0.983 inches (24.97 mm) | 0.983 inches (24.97 mm) |
| F-number | 2.000 | 2.000 |
| System Focal Length | 1.966 inches (49.933 mm) | 1.966 inches (49.933 mm) |
| Full System FOV in X at Front Aperture | 47.000 degrees | 47.000 degrees |
| Full System FOV in Y at Front Aperture | 47.000 degrees | 47.000 degrees |
| FPA Pixel Pitch | 10 µm | 10 µm |
| Rows of Pixels (X) | 4096 | 4096 |
| Columns of Pixels (Y) | 4096 | 4096 |
| Full FPA extent (X) | 1.613 inches (40.96 mm) | 1.613 inches (40.96 mm) |
| Full FPA extent (Y) | 1.613 inches (40.96 mm) | 1.613 inches (40.96 mm) |
| Q | 0.840 | 0.300 |
| Spectral band | 3.4-4.8 µm | 1.2-2.0 µm |
| Pixel IFOV | 200.27 µrad | 200.27 µrad |

In the example illustrated in FIG. 2, the objective lens set 110 includes three lenses, namely, a first lens 212, a second lens 214, and a third lens 216. In one example, the first lens 212 is a spherical lens made of Zinc Selenide (ZnSe). In one example, the second lens 214 is made of chalcogenide glass and has one spherical surface and an opposing aspheric surface. In one example, the third lens 216 is made of ZnSe and has a spherical surface with an opposing aspheric surface.

The system 200 includes a first lens group 230 that receives the electromagnetic radiation 120 via the first pupil 115, forms the intermediate image 135, and directs the electromagnetic radiation to a second lens group 240. In the illustrated example, the first lens group 230 includes a first lens 232 and a second lens 234, the intermediate image 135 being positioned between the first and second lenses 232, 234, as shown. In one example, the first lens 232 is made of Zinc Sulfide (ZnS) and has a spherical surface and an opposing aspheric surface. The second lens 234 can be made of ZnSe, and also has a spherical surface and an opposing aspheric surface.

The second lens group 240 focuses the electromagnetic radiation 120 via the second pupil 145 and onto the final image plane 155. In the illustrated example, the second lens group 240 includes a first lens 242, a second lens 244, a third lens 246, and a fourth lens 248. In one example, the first lens 242 is made of a chalcogenide glass, the second lens 244 is made of Barium Fluoride (BaF$_2$), the third lens 246 is made of SPINEL, and the fourth lens is made of BaF$_2$. In this example each of the four lenses of the second lens group 240 has a spherical surface and an opposing aspheric surface.

The system 200 includes an optical element 170 positioned between the second lens group 240 and the second pupil 145, which in this example is a filter having an adjustable thickness. As discussed above, the thickness of the filter 170 can be dynamically adjusted so as to selectively focus the MWIR spectral band and the SWIR spectral band onto the final image plane 155. However, as also discussed above, in other embodiments, alternate arrangements may be implemented without departing from the aspects of the re-imaged pupil and re-imaged field advantageously provided by the system 200.

Table 2 below provides an example of an optical prescription for an illustrative embodiment of the system of FIG. 2 corresponding to the parameters of Table 1 above. Reference numerals of FIG. 2 that correspond to a Surface Number within Table 2 are shown in parenthesis. The optical prescription for this illustrative embodiment may be generated using an equation which is an industry standard and which would be known to those skilled in the art. In Table 2, the columns designated K, A, B, C, and D are aspheric coefficients describing the specific surfaces. In the "Radius" column, a minus sign indicates that the center of curvature is to the left of the surface.

In addition, the optical train can include components having very fast optical speed, for example, F/1.5 or F/2.0, to achieve good signal-to-noise ratio for accurate target detection.

Figure 3A:
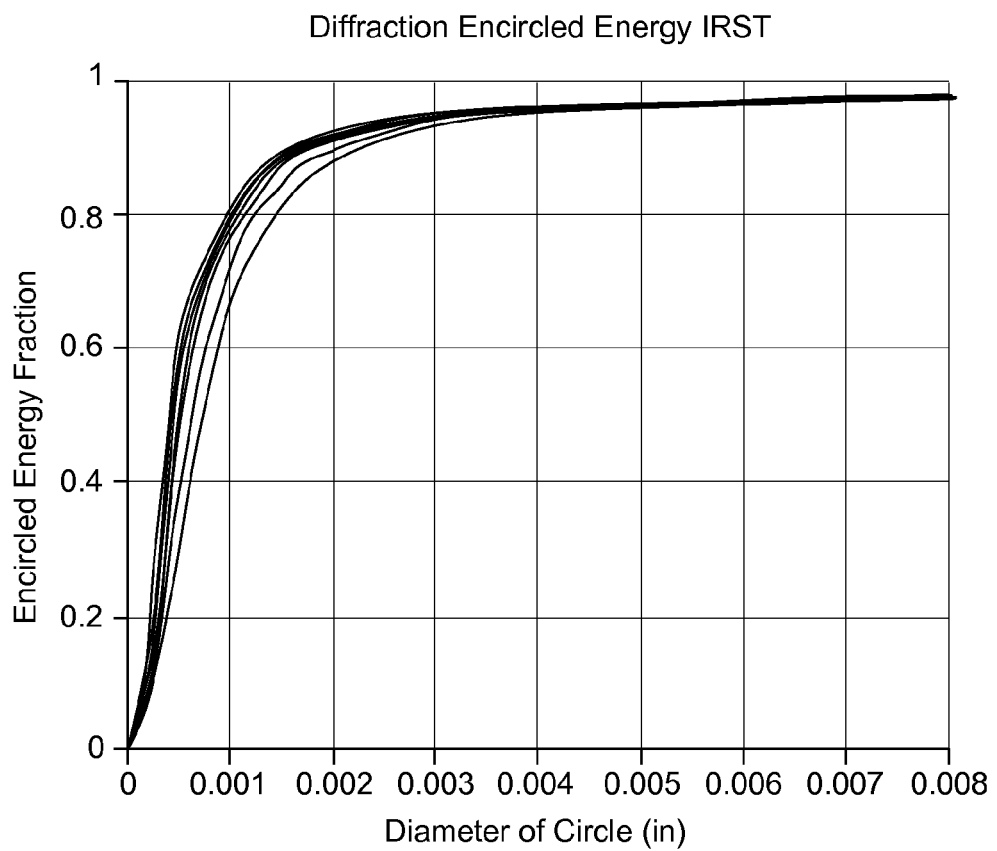
FIG. 3A is a graph showing performance data for the system of FIG. 2 in the MWIR spectral band.
Figure 3B:
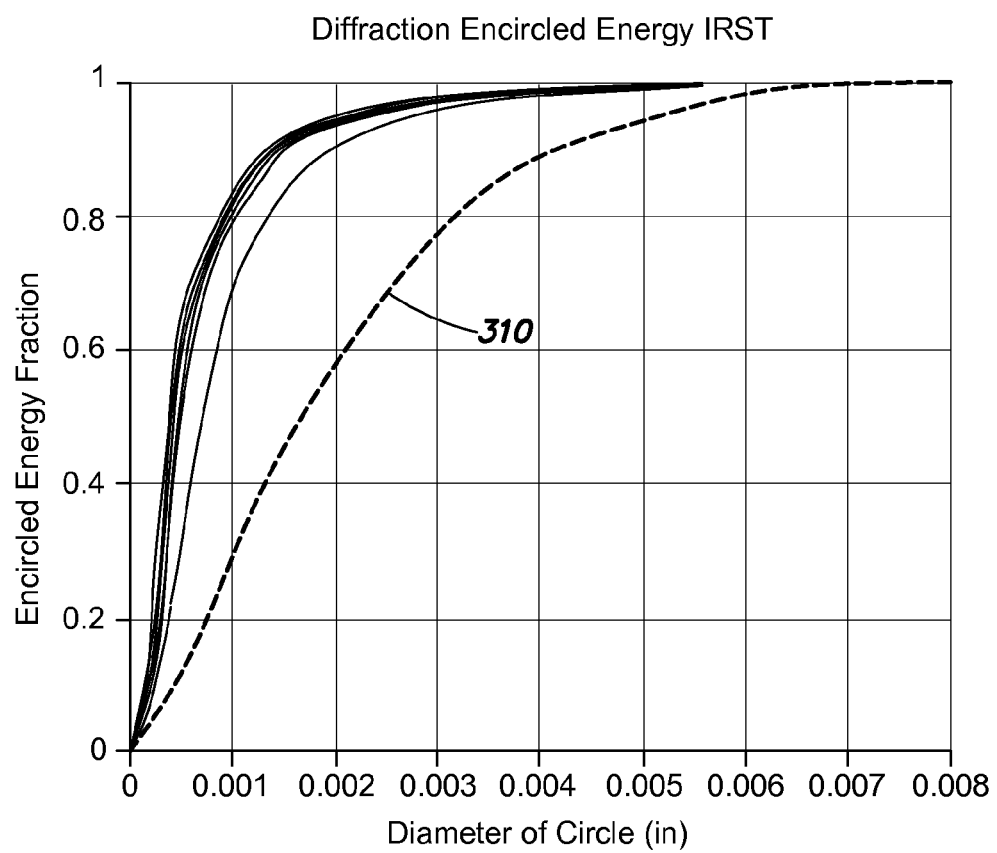
FIG. 3B is a graph showing performance data for the system of FIG. 2 in the SWIR spectral band.

FIGS. 3A and 3B illustrate graphs showing a measure of optical performance of an example of the system of FIG. 2, corresponding to the parameters provided in Tables 1 and 2 above, in the MWIR spectral band (FIG. 3A) and SWIR

TABLE 2

| Surface Number | Radius of Curvature (inches) | Thickness (inches) | Material | Surface Type | K | A | B | C | D |
|---|---|---|---|---|---|---|---|---|---|
| 1 | INFINITY | 0 | AIR | FLAT | | | | | |
| 2 | INFINITY | 0 | AIR | FLAT | | | | | |
| 3 | INFINITY | 0.734271 | AIR | FLAT | | | | | |
| 4 | INFINITY | 0 | AIR | FLAT | | | | | |
| 5 | INFINITY | 0.731274 | AIR | FLAT | | | | | |
| 6 | INFINITY | 0 | AIR | FLAT | | | | | |
| 7 | INFINITY | 1 | AIR | FLAT | | | | | |
| 8 | INFINITY | 1.404244 | AIR | FLAT | | | | | |
| 9 (212) | 3.25272 | 1.2 | ZNSE | Spherical | 0 | 0 | 0 | 0 | 0 |
| 10 | 2 | 2 | AIR | Aspheric | 0 | −2.83E−03 | −4.12E−04 | 0 | 0 |
| 11 (214) | −3.52963 | 0.35 | IG2 | Spherical | 0 | 0 | 0 | 0 | 0 |
| 12 | 5.3477 | 0.191641 | AIR | Aspheric | 0 | −1.86E−02 | 1.94E−03 | 0 | 0 |
| 13 (216) | 5.96959 | 1.6 | ZNSE | Aspheric | 0 | −1.63E−02 | 1.34E−03 | 0 | 0 |
| 14 | −4.09982 | 2.536957 | AIR | Spherical | 0 | 0 | 0 | 0 | 0 |
| 15 | INFINITY | 9.246146 | AIR | FLAT | 0 | 0 | 0 | 0 | 0 |
| 16 (232) | 16.66152 | 1.5 | ZNS | Spherical | 0 | 0 | 0 | 0 | 0 |
| 17 | −67.79016 | 7.312932 | AIR | Aspheric | 0 | 1.68E−04 | 7.05E−07 | 0 | 0 |
| 18 | INFINITY | 0 | AIR | FLAT | 0 | 0 | 0 | 0 | 0 |
| 19 | INFINITY | 2.444941 | AIR | FLAT | 0 | 0 | 0 | 0 | 0 |
| 20 | INFINITY | 16.275534 | AIR | FLAT | 0 | 0 | 0 | 0 | 0 |
| 21 (234) | 9.07164 | 2.6 | ZNSE | Aspheric | 0 | −1.05E−04 | 1.09E−06 | 0 | 0 |
| 22 | 24.63408 | 6.228499 | AIR | Spherical | 0 | 0 | 0 | 0 | 0 |
| 23 (242) | −4.5495 | 1 | IG2 | Spherical | 0 | 0 | 0 | 0 | 0 |
| 24 | −397.08845 | 1.806758 | AIR | Aspheric | 0 | −1.98E−03 | 6.58E−04 | 0 | 0 |
| 25 (244) | 12.65927 | 1.5 | BAF | Aspheric | 0 | −1.87E−02 | −2.38E−04 | 1.47E−05 | 0.00E+00 |
| 26 | −2.82414 | 0.1 | AIR | Spherical | 0 | 0 | 0 | 0 | 0 |
| 27 (246) | 90.4705 | 0.7 | SPINEL | Aspheric | 0 | −1.31E−03 | 1.67E−04 | 0 | 0 |
| 28 | 6.92079 | 0.1 | AIR | Spherical | 0 | 0 | 0 | 0 | 0 |
| 29 (248) | 3.70407 | 1.4 | BAF | Spherical | 0 | 0 | 0 | 0 | 0 |
| 30 | −4.0305 | 0.3 | AIR | Aspheric | 0 | 1.66E−04 | 4.04E−04 | 1.26E−05 | 0.00E+00 |
| 31 (170) | INFINITY | MWIR: 0.2 SWIR: 0.23578 | ZNS | FLAT | | | | | |
| 32 | INFINITY | MWIR: 0.5 SWIR: 0.46482 | AIR | FLAT | | | | | |
| 33 (162) | INFINITY | 0.15 | ZNS | FLAT | | | | | |
| 34 | INFINITY | 0.3 | AIR | FLAT | | | | | |
| 35 (Aperture stop) | INFINITY | 3.5 | "AIR" | FLAT | | | | | |
| 36 (Image) | INFINITY | 0 | "AIR" | FLAT | | | | | |

As discussed above, reimaging the pupil, and thereby providing both the first pupil 115 and the second pupil 145 provides a mechanism by which to achieve 100% cold shielding (as a cooling chamber window can be placed proximate the second pupil 145), while also minimizing the size of the chopper mirror 180 by minimizing the beam wander on the chopper mirror, which is achieved by placing the chopper mirror proximate the first pupil 115. The above example demonstrates a system having a wide FOV re-imaged pupil that is capable of dual spectral band (e.g., SWIR and MWIR) detection using only a single cryo-cooler 160 and associated electronics. The system enables optical detection over an ultra-wide field of regard by providing an optical train having sufficient instantaneous FOV to cover a large target space (e.g., 47° by 47°), and rapidly actuating the chopper mirror 180 at very high frequency, for example, in a range of about 24-240 Hz, to divert the line-of-sight of the detector 150 from one objective lens set 110 to the other and thereby effectively double the FOV, as discussed above.

spectral band (FIG. 3B). In particular, FIGS. 3A and 3B illustrate curves of the energy present on the detector 150 for different field points in the FOV, ranging from (0°,0°) to (22.5°,22.5°). Converting the horizontal (x) axis in each case to μm and comparing to a known detector size provides an indication of the amount of energy received by each pixel in the detector array. As may be seen with reference to FIG. 3A, performance is relatively constant over the entire FOV in the MWIR spectral band. As shown in FIG. 3B, in the SWIR spectral band, performance is slightly degraded for the far corner field point (22.5°,22.5°), represented by trace 310. However, this may not be particularly impactful in fielded applications because the systems can be designed and arranged to have overlapping fields-of-view between adjacent systems or look angles, such that the extreme corner or edge field points are not used in the final image.

In the example illustrated in FIG. 2, the optics "downstream" (to the right of in the figure) of first pupil 115 are shared by both spectral bands. This has the advantage of minimizing the size the system and potentially reducing cost because fewer components may be used. However, in other embodiments, dedicated optics can be provided for each spectral band. An example of such a system is shown schematically in FIG. 4. This arrangement has the advantage of being able to optimize the optics for each spectral band and potentially achieve improved performance.

Figure 4:
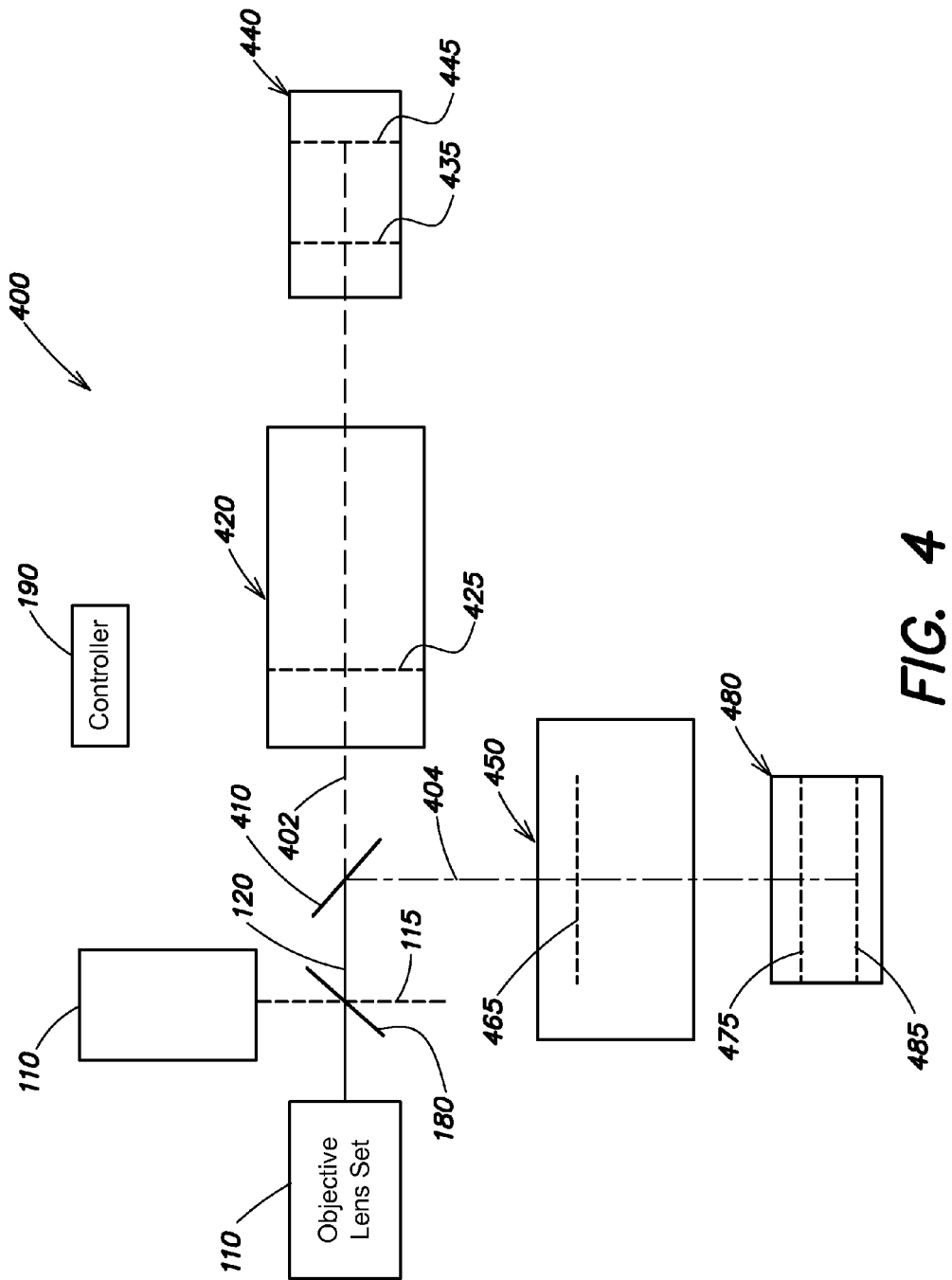
FIG. 4 is a block diagram of another example of a dual-FOV, dual-band re-imaging optical system according to aspects of the present invention.

Referring to FIG. 4, there is illustrated a block diagram of another example of a dual-band re-imaged optical system 400 according to certain embodiments. The system 400 includes dual-band objective optics 110, such as a dual-band objective lens set as discussed above, that receives incident electromagnetic radiation 120 and forms the first pupil 115. As discussed above with reference to FIG. 1, the chopper mirror 180 can be positioned proximate the first pupil 115 and configured to expand the system FOV by rapidly diverting the line-of-sight between two, optionally identical, front objectives 110 under control of the controller 190. In other examples, other optical elements can be placed at proximate the first pupil 115 to enable other functionality, as discussed further below.

The electromagnetic radiation 120 travels via the first pupil to a beamsplitter 410 that spectrally separates the electromagnetic radiation into a first spectral band 402 and a second spectral band 404.

The electromagnetic radiation in the first spectral band 402 travels to first re-imaging and focusing optics 420, which are configured to produce a first intermediate image plane 425 and a second pupil 435 for the first spectral band. The first re-imaging and focusing optics 420 are further configured to focus the electromagnetic radiation in the first spectral band 402 to a first detector assembly 440 and onto a first final image plane 445. Similarly, the electromagnetic radiation in the second spectral band 404 travels to second re-imaging and focusing optics 450, which are configured to produce a second intermediate image plane 465 and a second pupil 475 for the second spectral band. Thus, the two spectral bands share a common first pupil 115 and a second pupil 435/475 is formed individually for each spectral band. The second re-imaging and focusing optics 450 are further configured to focus the electromagnetic radiation in the second spectral band 404 to a second detector assembly 480 and onto a second final image plane 485. As discussed further below, the first and second re-imaging and focusing optics 420 and 450 each may include a plurality of lenses, the number, materials, and arrangement of which may vary depending on the spectral bands over which the system 400 is designed to operate. The detector assemblies 440 and 480 each may include one or more imaging sensors, for example, one or more focal plane arrays.

Figure 5A:
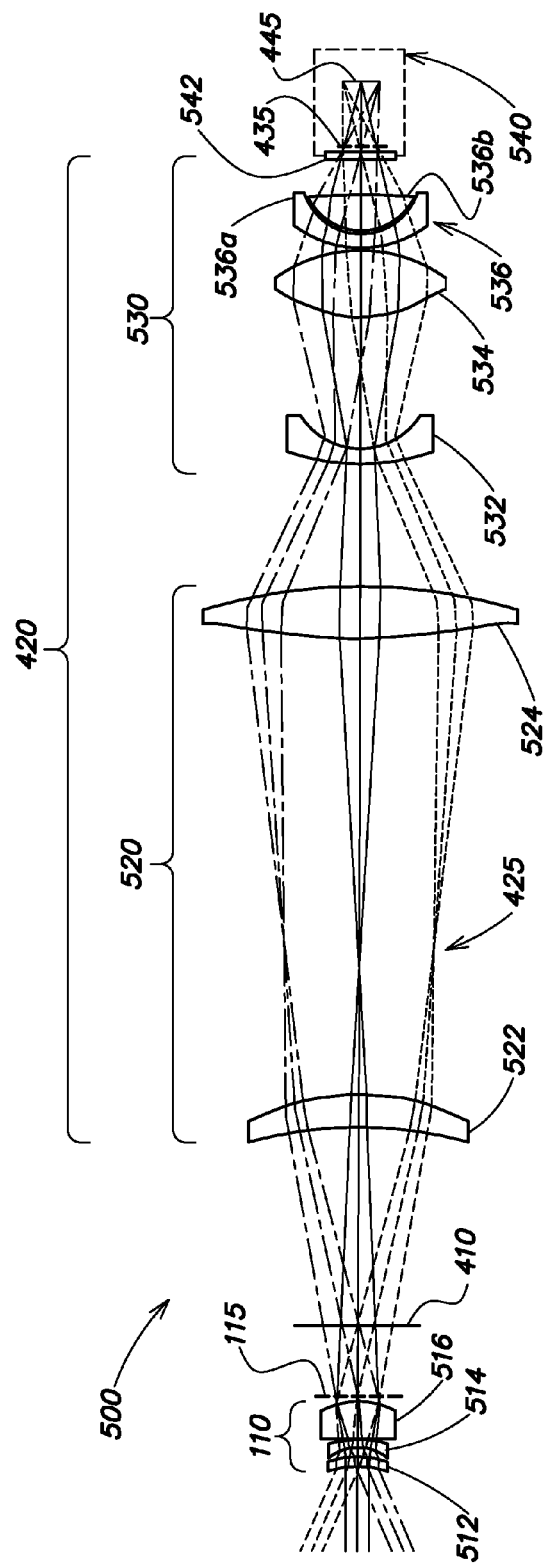
FIG. 5A is a ray trace of one example of the system of FIG. 4 showing the SWIR optical train, according to aspects of the present invention.
Figure 5B:
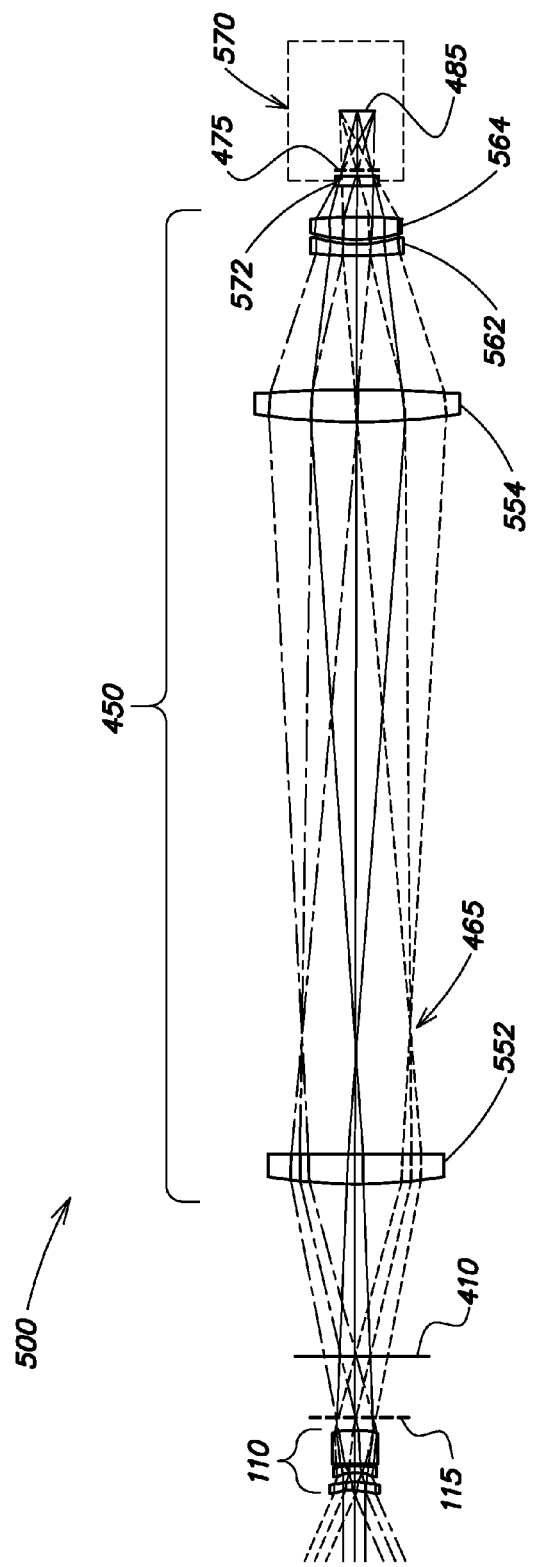
FIG. 5B is a ray trace of one example of the system of FIG. 4 showing the MWIR optical train, according to aspects of the present invention.

Referring to FIGS. 5A and 5B there are illustrated ray traces of one example of an implementation of the optical system 400 according to certain embodiments in which the system is configured for dual-band operation in the MWIR and SWIR spectral bands. In particular, in one example, the MWIR spectral band includes wavelengths in the range of approximately 3.4 µm to 5.0 µm, and the SWIR spectral band includes wavelengths in the range of approximately 1.0 µm to 2.0 µm. FIG. 5A shows the ray trace of the optical train for the SWIR spectral band, and FIG. 5B shows the ray trace of the optical train for the MWIR spectral band. In the illustrated example, the system 500 is configured to have a very wide instantaneous FOV (e.g., at least 45° by 45°, and in one example, 47° by 47°), i.e., without requiring the use of any beam-steering mechanisms. In addition, although not illustrated in FIGS. 5A and 5B, the system 500 can accommodate a chopper mirror 180 positioned proximate the first pupil 115, as discussed above with reference to FIG. 4, to provide dual-FOV coverage, for example, of at least 90° by 90°, and in one example, 94° by 94°, by switching the optical path between two objective lens sets 110. In other examples, other optical elements can be placed proximate the first pupil 115 to enable other functionality, as discussed further below.

As discussed above, in the example illustrated in FIGS. 5A and 5B, the objective optics 110 are dual-band and shared by both spectral bands. In the illustrated example, the dual-band objective optics 110 includes a set of three lenses, namely a first lens 512, a second lens 514, and a third lens 516; however, a variety of other configurations, including one or more lenses and/or mirrors, can be implemented. In one example, the first lens 512 of the objective lens set 110 is made of ZnSe, the second lens 514 is made of a chalcogenide glass (IG2), and the third lens 516 is made of ZnSe. In this example, each of the three lenses 512, 514, and 516 has a spherical surface and an opposing aspheric surface.

Referring to FIG. 5A, in the SWIR-band optical train, the first re-imaging and focusing optics 420 includes a first lens group 520 that receives the electromagnetic radiation 402 via the first pupil 115, forms the first intermediate image 425, and directs the electromagnetic radiation to a second lens group 530. In the illustrated example, the first lens group 520 includes a first lens 522 and a second lens 524, the intermediate image 425 being positioned between the first and second lenses 522, 524, as shown. In one example, the first lens 522 is made of ZnS and has a spherical surface and an opposing aspheric surface. The second lens 524 can be made of ZnSe, and also has a spherical surface and an opposing aspheric surface.

The second lens group 530 focuses the electromagnetic radiation 402 via the second pupil 435 onto the first final image plane 445. An imaging sensor (not shown) sensitive to the electromagnetic radiation 402 in the SWIR spectral band can be placed at the final image plane 445. In the illustrated example, the second lens group 530 includes a first lens 532, a second lens 534, and a third lens 536. In this example, the third lens 536 is a composite lens including a first lens element 536a and a second lens element 536b. The first and second lens elements 536a and 536b can be bonded together. In one example, the first lens 532 is made of a chalcogenide glass (e.g., IG2L), the second lens 534 is made of BaF$_2$, the first lens element 536a of the third lens 536 is made of glass, for example, NLAK9, and the second lens element 536b of the third lens 536 is made of BaF$_2$. In this example each of the four lenses of the second lens group 530 has a spherical surface and an opposing aspheric surface.

According to one embodiment, the system 500 includes a housing 540 that houses at least a portion of the detector assembly 440 (not shown in FIG. 5A) including the final image plane 445 at which the imaging sensor is located. The housing 540 can include a window 542 that is transparent to the SWIR-band electromagnetic radiation 402. In one example, the window 542 is made of ZnS. The window 542 can be positioned proximate the SWIR second pupil 435. The housing 540 may reduce the amount of stray light or out-of-band electromagnetic radiation incident on the imaging sensor.

Table 3 below provides an optical prescription for one example of the SWIR-band optics of system 500, including both the dual-band objective lens set 110 and the dedicated SWIR-band optics shown in FIG. 5A. Reference numerals of FIG. 5A that correspond to a Surface Number within Table 3 are shown in parenthesis. The optical prescription for this illustrative embodiment may be generated using an equation which is an industry standard and which would be known to those skilled in the art. In Table 3, the columns designated K, A, B, C, and D are aspheric coefficients describing the specific surfaces. In the "Radius" column, a minus sign indicates that the center of curvature is to the left of the surface.

According to one embodiment, the system 500 includes a housing 570 that houses at least a portion of the detector assembly 480 (not shown in FIG. 5A) including the final image plane 485 at which the imaging sensor is located. The housing 570 can be a cooling chamber, such as a cryogenic cooler or dewar assembly, generally referred to as a cryo-

TABLE 3

| Surface Number | Radius of Curvature, inch | Thickness, inch | Glass Type | Surface Type | K | A | B | C | D |
|---|---|---|---|---|---|---|---|---|---|
| 1 | INFINITY | 0.300057 | AIR | | | | | | |
| 2 | INFINITY | 0 | AIR | | | | | | |
| 3 | INFINITY | 0.300049 | AIR | | | | | | |
| 4 | INFINITY | 0 | AIR | | | | | | |
| 5 | INFINITY | 1 | AIR | | | | | | |
| 6 | INFINITY | 0.439124 | AIR | | | | | | |
| 7 (512) | −4.13484 | 0.4 | ZNSE | Spherical | 0 | 0 | 0 | 0 | 0 |
| 8 | −5.51778 | 0.429304 | AIR | Aspheric | 0 | −2.18E−02 | 2.30E−03 | 0 | 0 |
| 9 (514) | −1.86933 | 0.3 | IG2 | Spherical | 0 | 0 | 0 | 0 | 0 |
| 10 | −6.69519 | 0.1 | AIR | Aspheric | 0 | 1.06E−02 | −7.26E−03 | 0 | 0 |
| 11 (516) | 36.04512 | 1.5 | ZNSE | Aspheric | | −1.15E−02 | −1.70E−03 | 0 | 0 |
| 12 | −3.32492 | 11.592807 | AIR | Spherical | 0 | 0 | 0 | 0 | 0 |
| 13 (522) | −16.72644 | 1.4 | ZNS | Spherical | 0 | 0 | 0 | 0 | 0 |
| 14 | −9.19284 | 3.535092 | AIR | Aspheric | 0 | 1.91E−04 | 2.68E−06 | 0 | 0 |
| 15 | INFINITY | 0 | AIR | | | | | | |
| 16 | INFINITY | 1.660793 | AIR | | | | | | |
| 17 | INFINITY | 14.1 | AIR | | | | | | |
| 18 (524) | 22.53775 | 2.2 | ZNSE | Aspheric | 0 | −2.01E−04 | 7.65E−07 | 0 | 0 |
| 19 | −21.9628 | 5.203679 | AIR | Spherical | 0 | 0 | 0 | 0 | 0 |
| 20 (532) | 10.2468 | 0.6 | IG2L | Spherical | 0 | 0 | 0 | 0 | 0 |
| 21 | 2.82465 | 5.598235 | AIR | Aspheric | 0 | −7.88E−04 | −2.94E−04 | 0 | 0 |
| 22 (534) | 4.91916 | 2.8 | BAF2 | Aspheric | 0 | −4.72E−04 | −1.27E−04 | 0 | 0 |
| 23 | −6.14706 | 0.1 | AIR | Spherical | 0 | 0 | 0 | 0 | 0 |
| 24 (536a) | 4.17661 | 0.6 | NLAK9 | Aspheric | 0 | −1.59E−03 | −5.80E−05 | 0 | 0 |
| 25 | 2.50446 | 0.173532 | AIR | Spherical | 0 | 0 | 0 | 0 | 0 |
| 26 (536b) | 2.52869 | 1.5 | BAF2 | Spherical | 0 | 0 | 0 | 0 | 0 |
| 27 | −20.87666 | 1.114496 | AIR | Aspheric | 0 | 1.46E−03 | 7.06E−05 | 0 | 0 |
| 28 | INFINITY | 0 | AIR | | | | | | |
| 29 | INFINITY | 0.5 | AIR | | | | | | |
| 30 (542) | INFINITY | 0.15 | ZNS | FLAT | | | | | |
| 31 | INFINITY | 0.3 | AIR | | | | | | |
| 32 (aperture stop) | INFINITY | 2.8 | "AIR" | | | | | | |
| 33 FPA | INFINITY | 0 | "AIR" | | | | | | |

Referring to FIG. 5B, in the MWIR-band optical train, the second re-imaging and focusing optics 450 includes a first pair of lenses 552 and 554 that receive the electromagnetic radiation 404 via the first pupil 115 and form the second intermediate image 465. In one example, both the first lens 552 and the second lens 554 of the first pair are made of silicon (Si). The second intermediate image 465 is formed between the two lenses 552 and 554, as shown. In one example, each of the first and second lenses 552 and 554 of the first pair has a spherical surface and an opposing aspheric surface. The two lenses 552 and 554 may be arranged such that the aspheric surfaces face one another.

The first pair of lenses directs the electromagnetic radiation 404 to a second pair of lenses 562 and 564. In one example, the first lens 562 of the second pair is made of Germanium (Ge) and the second lens 564 of the second pair is made of silicon. The second pair of lenses 562 and 564 direct and focus the electromagnetic radiation 404 via the MWIR second pupil 475 onto the final image plane 485. An imaging sensor (not shown) sensitive to the electromagnetic radiation 404 in the MWIR spectral band can be placed at the final image plane 485. In one example each of the first and second lenses 562 and 564 of the second pair includes a spherical surface and an opposing aspheric surface. The lenses 562 and 564 can be arranged such that the spherical surfaces are adjacent one another.

cooler, that is configured to cool the imaging sensor to well below ambient temperatures, for example, to approximately 80° Kelvin, to reduce thermal noise and enable thermal imaging in the MWIR spectral band. The housing 570 can include a window 572 that is transparent to the MWIR-band electromagnetic radiation 404. In one example, the window 572 is made of silicon. The window 572 can be positioned proximate the second MWIR pupil 475 and can be coincident with, or may serve as, a cold aperture stop for the system 500.

Table 4 below provides an optical prescription for one example of the MWIR-band optics of system 500, including both the dual-band objective lens set 110 and the dedicated MWIR-band optics shown in FIG. 5B. Reference numerals of FIG. 5B that correspond to a Surface Number within Table 4 are shown in parenthesis. The optical prescription for this illustrative embodiment may be generated using an equation which is an industry standard and which would be known to those skilled in the art. In Table 4, the columns designated K, A, B, C, and D are aspheric coefficients describing the specific surfaces. In the "Radius" column, a minus sign indicates that the center of curvature is to the left of the surface.

TABLE 4

| Surface Number | Radius of Curvature, inch | Thickness, inch | Glass Type | Surface Type | K | A | B | C | D |
|---|---|---|---|---|---|---|---|---|---|
| 1 | INFINITY | 0.300057 | AIR | | | | | | |
| 2 | INFINITY | 0 | AIR | | | | | | |
| 3 | INFINITY | 0.300049 | AIR | | | | | | |
| 4 | INFINITY | 0 | AIR | | | | | | |
| 5 | INFINITY | 1 | AIR | | | | | | |
| 6 | INFINITY | 0.439124 | AIR | | | | | | |
| 7 | −4.13484 | 0.4 | ZNSE | Spherical | 0 | 0 | 0 | 0 | 0 |
| 8 | −5.51778 | 0.429304 | AIR | Aspheric | 0 | −2.18E−02 | 2.30E−03 | 0 | 0 |
| 9 | −1.86933 | 0.3 | IG2 | Spherical | 0 | 0 | 0 | 0 | 0 |
| 10 | −6.69519 | 0.1 | AIR | Aspheric | 0 | 1.06E−02 | −7.26E−03 | 0 | 0 |
| 11 | 36.04512 | 1.5 | ZNSE | Aspheric | 0 | −1.15E−02 | −1.70E−03 | 0 | 0 |
| 12 | −3.32492 | 11.000182 | AIR | Spherical | 0 | 0 | 0 | 0 | 0 |
| 13 (552) | 23.39535 | 1.35 | SILICON | Spherical | 0 | 0 | 0 | 0 | 0 |
| 14 | 355.05257 | 3.126036 | AIR | Aspheric | 0 | 5.83E−05 | 0 | 0 | 0 |
| 15 | INFINITY | 0 | AIR | | | | | | |
| 16 | INFINITY | 1.202833 | AIR | | | | | | |
| 17 | INFINITY | 14.1 | AIR | | | | | | |
| 18 | INFINITY | 0 | AIR | | | | | | |
| 19 | INFINITY | 2.599032 | AIR | | | | | | |
| 20 | INFINITY | 9 | AIR | | | | | | |
| 21 | INFINITY | 2.842639 | AIR | | | | | | |
| 22 (554) | 30.91012 | 1.4 | SILICON | Aspheric | 0 | −9.39E−05 | 1.88E−07 | 0 | 0 |
| 23 | −86.2317 | 6.087678 | AIR | Spherical | 0 | 0 | 0 | 0 | 0 |
| 24 (562) | 36.32128 | 0.5 | GERM | Aspheric | 0 | 6.51E−04 | −4.04E−05 | 0 | 0 |
| 25 | 6.51233 | 0.188437 | AIR | Spherical | 0 | 0 | 0 | 0 | 0 |
| 26 (564) | 7.27647 | 1 | SILICON | Spherical | 0 | 0 | 0 | 0 | 0 |
| 27 | −22.09112 | 1.099564 | AIR | Aspheric | 0 | 7.29E−04 | −4.60E−05 | 0 | 0 |
| 28 | INFINITY | 0 | AIR | | | | | | |
| 29 | INFINITY | 0.5 | AIR | | | | | | |
| 30 (572) | INFINITY | 0.15 | SILICON | FLAT | | | | | |
| 31 | INFINITY | 0.3 | AIR | | | | | | |
| 32 (aperture stop) | INFINITY | 2.8 | "AIR" | | | | | | |
| 33 (FPA) | INFINITY | 0 | "AIR" | | | | | | |

Figure 6A:
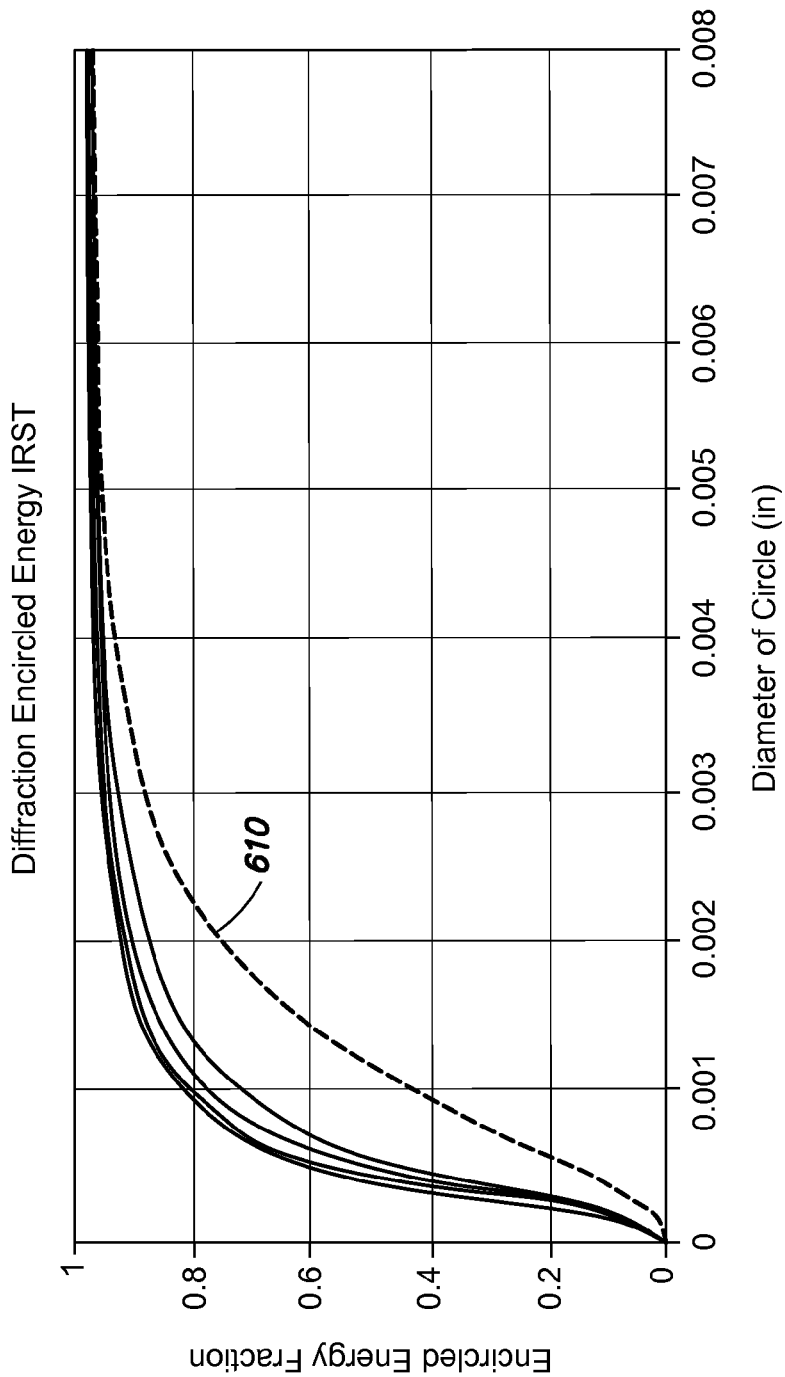
FIG. 6A is a graph showing performance data for the system of FIGS. 5A and 5B in the SWIR spectral band.
Figure 6B:
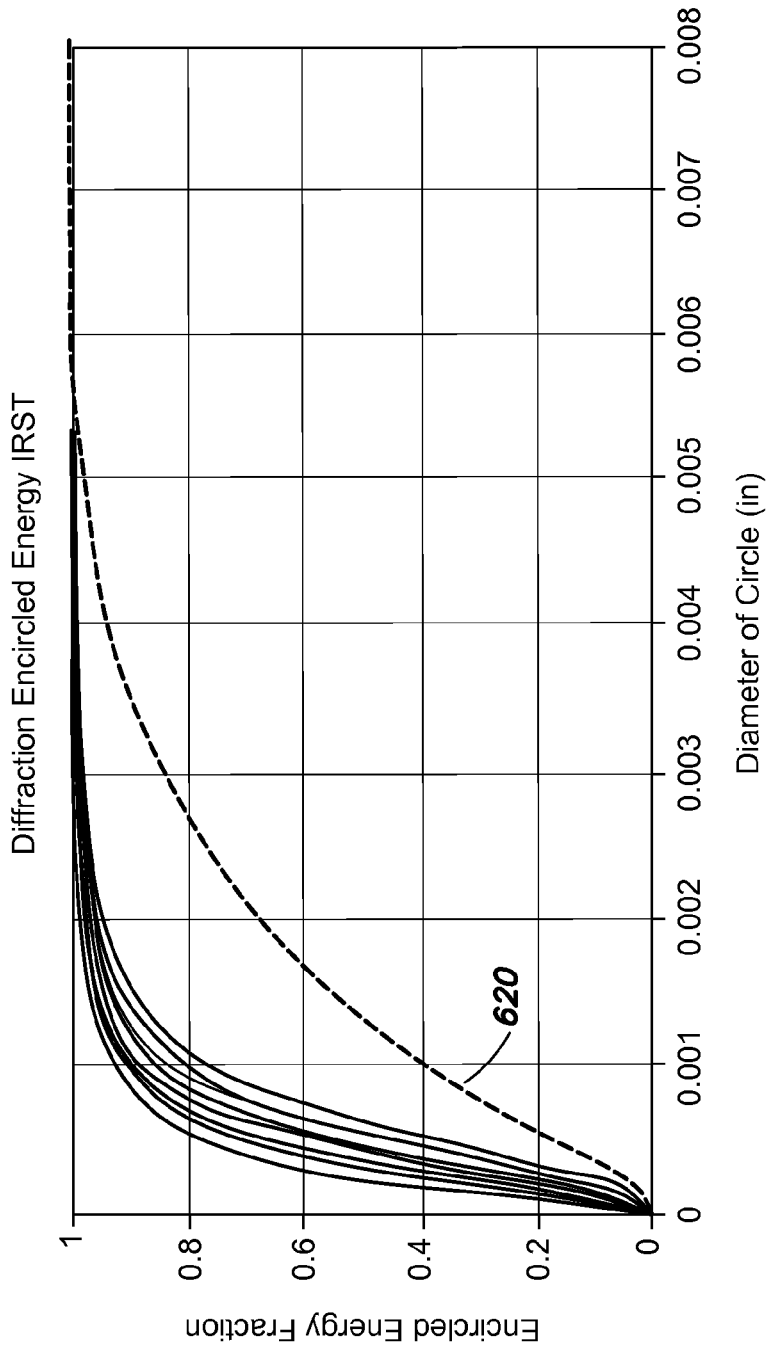
FIG. 6B is a graph showing performance data for the system of FIGS. 5A and 5B in the MWIR spectral band.

FIGS. 6A and 6B illustrate graphs showing a measure of optical performance of an example of the system of FIGS. 5A and 5B, corresponding to the prescription provided in Tables 3 and 4 above, in the MWIR spectral band (FIG. 6A) and SWIR spectral band (FIG. 6B). In particular, FIGS. 6A and 6B illustrate curves of the energy present on the detectors 480 and 440, respectively, for different field points in the FOV, ranging from (0°,0°) to (22.5°,22.5°). As discussed above, converting the horizontal (x) axis in each case to μm and comparing to a known detector size provides an indication of the amount of energy received by each pixel in the detector array. As may be seen with reference to FIGS. 5A and 5B, performance is relatively constant over the most of the FOV in both spectral bands; however, performance is slightly degraded for the far corner field point (22.5°,22.5°), represented by traces 610 and 620. As discussed above, this may not be particularly impactful in fielded applications because the systems can be designed and arranged to have overlapping fields-of-view between adjacent systems or look angles, such that the extreme corner or edge field points are not used in the final image.

As discussed above, in certain embodiments of the systems 200 or 500, a chopper mirror can be placed proximate the first pupil 115 and used to expand the system FOV. However, aspects and embodiments are not limited to the use of a chopper mirror or beam deflector at the first pupil, and a variety of other optical components can be accommodated at this location to enable a range of different functionalities. For example, in certain embodiments a deformable mirror or wavefront sensor can be placed proximate the first pupil 115 to improve image quality. In other embodiments, an aperture reformatting device can be placed proximate the first pupil 115 to allow for discrimination of targets near bright light sources, for example. In other embodiments, a calibration device or de-jitter mirror can be placed proximate the first pupil 115. Thus, the dual-pupil design of the optical systems disclosed herein can have broadly advantageous functionality for a variety of different applications and purposes.

In addition, because the systems are field re-imaging as well (provide the intermediate image planes 135, 425, or 465 in addition to the respective final image plane(s)), further functionality can be achieved by placing an optical element proximate the intermediate image plane(s) without disrupting the primary imaging function (performed by the detector assemblies). For example, for compressive sensing applications a Hadamard mask or similar device can be placed proximate the intermediate image plane. In other examples, access to the intermediate image plane may allow for laser jamming reduction, improved image quality for detection, tracking, or identification, or other applications. In other examples, a field stop or shutter can be placed proximate the intermediate image plane for stray light control or noise reduction, for example.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A dual-pupil, dual spectral band, wide field-of-view re-imaged refractive optical imaging system comprising:
   a dual-band front objective lens group configured to receive electromagnetic radiation over the field-of-view of the optical imaging system, to form a first pupil of the optical imaging system, and to direct the electromagnetic radiation through the first pupil, the electromagnetic radiation including first and second non-overlapping spectral bands, the field-of-view spanning at least 45°×45°;
   a second dual-band front objective lens group having a second field-of-view spanning at least 45°×45°;
   a beam deflector disposed proximate the first pupil and configured to selectively deflect a line-of-sight of the optical imaging system to the second dual-band front objective lens set; and
   a re-imaging refractive optical sub-system configured to receive the electromagnetic radiation via the first pupil, to form at least one intermediate image plane, and to focus the electromagnetic radiation via at least one second pupil onto at least one final image plane to form a first image from the first spectral band and a second image from the second spectral band.

2. The optical imaging system of claim 1 further comprising a beamsplitter positioned between the first pupil and the re-imaging refractive optical sub-system and configured to split the electromagnetic radiation into the first spectral band and the second spectral band, wherein the first spectral band includes a mid-wave infrared (MWIR) spectral band and the second spectral band includes a short-wave infrared (SWIR) spectral band, and wherein the re-imaging refractive optical sub-system includes an MWIR sub-system configured to receive MWIR spectral band via the first pupil, to form an MWIR intermediate image plane, and to focus the MWIR spectral band via an MWIR second pupil onto an MWIR final image plane to form the first image, and an SWIR sub-system configured to receive the SWIR spectral band via the first pupil, to form an SWIR intermediate image plane, and to focus the SWIR spectral band via an SWIR second pupil onto an SWIR final image plane to form the second image.

3. The optical imaging system of claim 2 wherein the MWIR sub-system includes a first pair of lenses and a second pair of lenses, the MWIR intermediate image plane being positioned between first and second lenses of the first pair of lenses, and the second pair of lenses being positioned between the first pair of lenses and the MWIR second pupil.

4. The optical imaging system of claim 3 wherein the first and second lenses of the first pair of lenses are made of silicon, and wherein a first lens of the second pair of lenses is made of Germanium and a second lens of the second pair of lenses is made of silicon.

5. The optical imaging system of claim 4 wherein the MWIR sub-system further includes a cooling chamber having a chamber window positioned proximate the MWIR second pupil, the chamber window being transparent to the MWIR spectral band, and the MWIR final image plane being located within cooling chamber.

6. The optical imaging system of claim 2 wherein the SWIR sub-system includes a first lens group and a second lens group, the first lens group including a first lens and a second lens, the SWIR intermediate image plane being positioned between the first lens and the second lens, and the second lens group being positioned between the second lens of the first lens group and the SWIR second pupil.

7. The optical imaging system of claim 6 wherein first lens is made of Zinc Sulfide and the second lens is made of Zinc Selenide, and wherein the second lens group includes a third lens made of chalcogenide glass, a fourth lens made of Barium Fluoride, and a fifth composite lens, the fifth composite lens including a first lens element made of glass and a second lens element made of Barium Fluoride.

8. The optical imaging system of claim 1 further comprising a controller coupled to the beam deflector and configured to actuate the beam deflector to alternately switch the line-of-sight between the dual-band front objective lens set and the second dual-band front objective lens set.

9. A dual-pupil, dual spectral band, wide field-of-view re-imaged refractive optical imaging system comprising:
   a dual-band front objective lens group configured to receive electromagnetic radiation over the field-of-view of the optical imaging system, to form a first pupil of the optical imaging system, and to direct the electromagnetic radiation through the first pupil, the electromagnetic radiation including first and second non-overlapping spectral bands, the field-of-view spanning at least 45°×45°; and
   a re-imaging refractive optical sub-system configured to receive the electromagnetic radiation via the first pupil, to form a single intermediate image plane, and to focus the electromagnetic radiation via a single second pupil onto at least one final image plane to form a first image from the first spectral band and a second image from the second spectral band,
   wherein the re-imaging refractive optical sub-system includes:
   a first dual-band lens group configured to receive the electromagnetic radiation via the first pupil and to form the intermediate image plane, the first dual-band lens group including a first lens and a second lens, the first pupil being located between the dual-band front objective lens group and the first lens, and the intermediate image plane being positioned between the first and second lenses; and
   a second dual-band lens group configured to receive the electromagnetic radiation from the second lens of the first dual-band lens group and to focus the electromagnetic radiation onto the at least one final image plane via the second pupil, the second pupil being located between the second dual-band lens group and the at least one final image plane.

10. The optical imaging system of claim 9 wherein the first spectral band includes a mid-wave infrared (MWIR) spectral band and the second spectral band includes a short-wave infrared (SWIR) spectral band.

11. The optical imaging system of claim 10 further comprising a cooling chamber having a chamber window positioned between the second dual-band lens group and the second pupil, the at least one image plane being located within the cooling chamber.

12. The optical imaging system of claim 11 further comprising a filter having an adjustable thickness and positioned between the second dual-band lens group and the second pupil.

13. The optical imaging system of claim 12 wherein the at least one final image plane includes a first image plane positioned a first distance from the second pupil and a second image plane positioned a second distance from the second pupil, the first and second distances being different, and further comprising a controller configured to selectively adjust the adjustable thickness of the filter to a first thickness to focus the MWIR spectral band onto the first image plane and to a second thickness to focus the SWIR spectral band onto the second image plane.

14. The optical imaging system of claim 10 wherein the MWIR spectral band includes a first wavelength range of approximately 3.4 µm-5.0 µm, and the SWIR spectral band includes a second wavelength range of approximately 1.0 µm-2.0 µm.

15. The optical imaging system of claim 14 wherein the first lens of the first dual-band lens group is made of Zinc Sulfide and the second lens of the first dual-band lens group is made of Zinc Selenide.

16. The optical imaging system of claim 15 wherein the dual-band front objective lens group includes a set of three lenses, including a first objective lens made of Zinc Selenide, a second objective lens made of chalcogenide glass, and a third objective lens made of Zinc Selenide.

17. The optical imaging system of claim 16 wherein the second dual-band lens group includes a set of four lenses, including a third lens made of chalcogenide glass, a fourth lens made of Barium Fluoride, a fifth lens made of SPINEL, and a sixth lens is made of Barium Fluoride.

18. The optical imaging system of claim 17 wherein an optical speed of the optical imaging system is F/2.0.

19. The optical imaging system of claim 9 further comprising a second dual-band front objective lens group having a second field-of-view spanning at least 45°×45°, and a beam deflector disposed proximate the first pupil and configured to selectively deflect a line-of-sight of the optical imaging system to the second dual-band front objective lens set.

* * * * *